Nov. 18, 1958  P. ORAZI  2,860,846
ROTARY SUSTAINING WING FOR AIRCRAFT
Filed Dec. 1, 1954
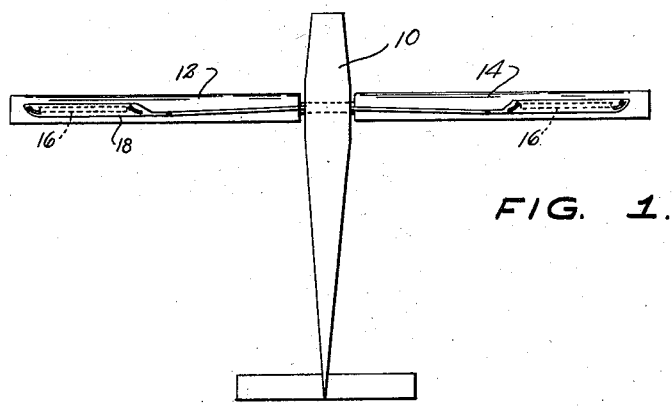
FIG. 1.
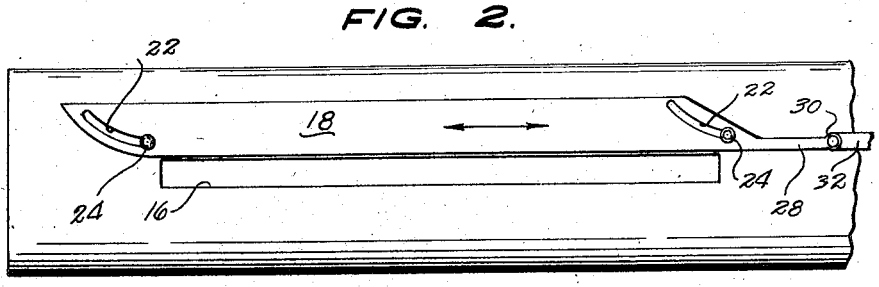
FIG. 2.
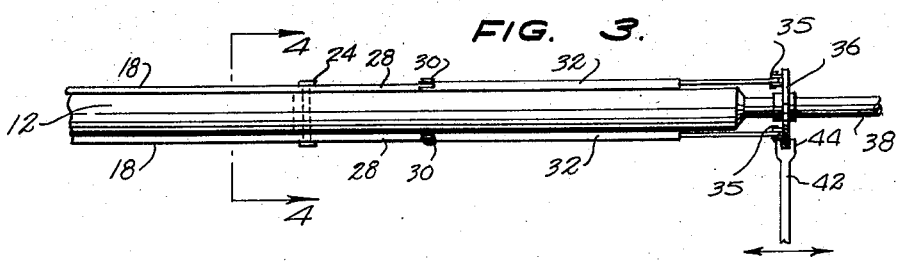
FIG. 3.
FIG. 4.
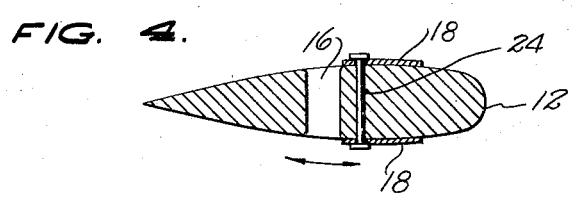
INVENTOR.
PAOLO ORAZI,
BY
*Albert M. Zalkind*
ATTORNEY

2,860,846

ROTARY SUSTAINING WING FOR AIRCRAFT

Paolo Orazi, Brescia, Italy

Application December 1, 1954, Serial No. 472,462

Claims priority, application Italy August 14, 1954

8 Claims. (Cl. 244—39)

This invention relates to ailerons for aircraft and more particularly for rotary wing aircraft.

One of the difficulties attendant the construction of rotary wing aircraft is the provision of ailerons for the wings. If ailerons are fastened to the wing edges, as is conventional with fixed wing aircraft, the wings are then out of balance in rotation and the construction and mechanical difficulties become very complicated.

Accordingly, it is an object of my invention to provide an aileron construction suitable for use with rotary wing aircraft, although also usable for fixed wing aircraft.

It is another object of my invention to provide an aileron and operating means of an exceedingly simple and rugged nature.

In brief, my invention contemplates placing slots through the rotary wings, the slots being disposed at the rotary axes thereof, or close to the rotary axes and thus at substantially the center of pressure or the center of normal force on the wings. Shutter means are provided which are carried by the wings and which are operable to close respective slots, as by manipulation of a conventional joy stick. The slots pass completely through the wings and when the shutters are positioned so that the slots are open, a predetermined amount of air can pass therethrough. Thus, if the slot of one wing is open while the other is closed, it will be apparent that the closed slot wing will provide more lift and, accordingly, the craft will tilt, whence an aileron effect is achieved. Further, the slots may be partially closed to control the amount of tilt.

My invention thus achieves a fairly light weight means of increasing or decreasing the lift of either wing without unbalance, drag or mechanical complications which would result were ailerons provided on the wings at the edges thereof.

While it would be possible to achieve an aileron effect by braking the rotary means of either of the wings, such construction would not be desirable from a mechanical viewpoint. It would not have the effect achieved by the present invention to the extent of effecting unified lateral control with a single control handle, either when the wings are rotating or, as is sometimes done with rotary wing aircraft, when the wings are held non-rotative relative the fuselage.

A detailed disclosure of my invention will now be given in conjunction with the appended drawings, in which:

Fig. 1 is a plan view of a rotary wing aircraft showing the disposition of the slots and shutters in the rotary wings.

Fig. 2 is an enlarged detail showing the slot and shutter arrangement.

Fig. 3 is an enlarged detail showing a mode of control for a shutter, and

Fig. 4 is a section through 4—4 of Fig. 3.

Referring now to the drawing, my invention comprises an aircraft having a fuselage 10, and rotary wings 12 and 14 provided with slots 16. Each wing carries at its top and bottom surfaces a shutter 18 slidable disposed directly on the wing. Thus, it will be understood that the curvature of the shutter and the wing are such as to effect smooth sliding and substantial contiguity.

The shutters are arranged to slide in unison toward or away from the slot 16, as indicated by the double-headed arrow in Fig. 4, so as to open or close the slot, fully or partially.

In order to achieve this purpose, the shutters are provided with sloping cam slots 22 at either end, and a pin 24 passes through the slots 22 and through the wing body. Accordingly, it will be understood that as the shutters are pulled or pushed in either direction, as indicated by the double-headed arrow in Fig. 2, the coaction between the pins and the slots 22 will cause the shutters to translate widthwise with respect to the slot 16 and to assume any desired position whereat they may be held so as to close or fully or partially open the slot 16.

In order to effect such translation of the shutter, I provide an extension 28 on each shutter pivotally connected by suitable pins 30 to rodlike elements 32 slidable with respect to the wings. These rods are in turn pivotally connected at 35 to a swash plate 36 slidable surrounding the shaft 38 to which the wing is fastened and which causes rotation thereof. A forked lever 42 is provided, which will be assumed to be operable by a joy stick (not shown), so as to reciprocate in either of the directions of the double-headed arrow shown in Fig. 3. Thus, the fork 44 engages the plate 36 to effect motion of the plate longitudinally relative the wing and thus move the shutters 18 to opened or closed positions.

Having thus described my invention, I am aware that many changes may be made without departing from the spirit thereof and, accordingly, I do not seek to be limited to the precise description herein given except as set forth in the appended claims.

I claim:

1. In an aircraft, an elongated wing mounted for continuous rotation about its longitudinal axis, said wing having a slot therethrough and slidable shutter means operable to predetermined positions for opening and closing said slot, the direction of sliding being at least partially in the direction of the longitudinal axis of said wing.

2. A device as set forth in claim 1 wherein said slot is substantially intermediate the leading and trailing edges of said wing.

3. A device as set forth in claim 1, wherein said shutter means comprises a plate slidable on a surface of said wing.

4. A device as set forth in claim 1 wherein said shutter means comprises a pair of plates disposed on opposite surfaces of said wing and slidable in unison with respect thereto.

5. A device as set forth in claim 1 wherein said shutter means comprises a plate slidably carried by said wing and having cam slots therein disposed angularly with respect to the longitudinal axis of said wing, including a pin means passing through said cam slots and secured to said wing, whereby motion of said plate in the direction of the longitudinal axis of said wing effects translation of said plate to close said slot.

6. In an aircraft, a continuously rotative elongated wing having a slot therethrough positioned along the length of said wing and means comprising a shutter rotative with said wing for opening and closing said slot to a predetermined extent, said shutter being restrained to translatory movement, a rotative plate connected to said shutter, and fork means engaging said plate operative to effect reciprocation thereof for actuating said shutter to open or close said slot.

7. A roll control for aircraft comprising an elongated wing continuously rotative about its longitudinal axis and having a slot therethrough elongated in the direction of said longitudinal axis, a shutter for closing said slot, said shutter being carried by said wing and rotative therewith; said shutter being mounted for reversible translatory movement to open and close said slot wherein the direction of translatory movement has longitudinal and transverse components with respect to the longitudinal axis of said wing.

8. A roll control for aircraft as set forth in claim 7, including cam means intermediate said shutter and said wing for restraining said shutter to translatory movement with longitudinal and transverse components, and means for exerting a longitudinal force on said shutter to effect movement thereof.

References Cited in the file of this patent

UNITED STATES PATENTS

| | | |
|---|---|---|
| 1,631,603 | Raynolds | June 7, 1927 |
| 2,077,072 | Rose | Apr. 13, 1937 |
| 2,261,363 | Griswold | Nov. 4, 1941 |
| 2,406,475 | Rogers | Aug. 27, 1946 |